United States Patent
Dell'Oglio

(10) Patent No.: US 10,601,269 B2
(45) Date of Patent: Mar. 24, 2020

(54) ROTOR GROUP FOR ELECTROMECHANICAL COMPONENTS AND METHOD FOR MANUFACTURING SAID ROTOR GROUP

(71) Applicant: METEOR S.a.s. di Fabio Dell'Oglio & C., Mareno di Piave (Treviso) (IT)

(72) Inventor: Fabio Dell'Oglio, Conegliano (IT)

(73) Assignee: METEOR S.a.s. di Fabio Dell'Oglio & C., Mareno di Piave (IT)

( * ) Notice: Subject to any disclaimer, the term of this patent is extended or adjusted under 35 U.S.C. 154(b) by 96 days.

(21) Appl. No.: 15/581,343

(22) Filed: Apr. 28, 2017

(65) Prior Publication Data

US 2017/0317542 A1    Nov. 2, 2017

(30) Foreign Application Priority Data

May 2, 2016 (IT) .......... 102016000044596

(51) Int. Cl.
*H02K 1/27* (2006.01)
*H02K 1/30* (2006.01)
*H02K 15/03* (2006.01)

(52) U.S. Cl.
CPC ......... *H02K 1/2706* (2013.01); *H02K 1/2733* (2013.01); *H02K 1/30* (2013.01); *H02K 15/03* (2013.01)

(58) Field of Classification Search
CPC .......... H02K 1/27; H02K 15/03; H02K 37/12; H02K 1/28; H02K 1/2733; H02K 1/2793; H02K 37/125

(Continued)

(56) References Cited

U.S. PATENT DOCUMENTS 4,206,379 A * 6/1980 Onda .............. G04C 13/11
                                              310/156.12
4,318,017 A * 3/1982 Migeon ............ H02K 1/2793
                                              310/156.16

(Continued)

FOREIGN PATENT DOCUMENTS

DE         70 15 880 U    8/1970
DE           7015880 U    8/1970

(Continued)

*Primary Examiner* — Jermele M Hollington
*Assistant Examiner* — Leda T Pham
(74) *Attorney, Agent, or Firm* — Vorys, Sater, Seymour and Pease LLP; Anthony Venturino

(57) ABSTRACT

Provided is a rotor group for electromechanical components including a substantially cylindrical, magnetic element, defining a main axis, two bases and a side surface, and including a through hole substantially centred on the main axis, defining inner walls and including at least one groove, for the rotational constraint around the main axis of a transmission element with respect to the magnetic element, on the inner walls, and the transmission element including polymeric material, mainly arranged inside the through hole, including coupling tabs, in contact with the inner walls of the through hole, configured for the rotational constraint around the main axis of the transmission element with respect to the magnetic element and including coupling tabs presenting folded free ends in situ, in contact with at least one of the bases, adapted to constrain the translation along the main axis of the transmission element with respect to the magnetic element.

12 Claims, 3 Drawing Sheets

(58) Field of Classification Search
USPC .......................... 310/156.22, 156.01–156.84
See application file for complete search history.

(56) References Cited

U.S. PATENT DOCUMENTS

| | | | | |
|---|---|---|---|---|
| 4,340,560 | A * | 7/1982 | Migeon ................ | B29C 65/562 |
| | | | | 264/249 |
| 9,048,715 | B2 * | 6/2015 | Kodani ................ | H02K 1/2733 |
| 2013/0106219 | A1 * | 5/2013 | Schneider ................ | H02K 5/16 |
| | | | | 310/89 |
| 2013/0334922 | A1 * | 12/2013 | Park, II ................ | H02K 1/2733 |
| | | | | 310/156.09 |
| 2016/0164370 | A1 * | 6/2016 | Park ........................ | H02K 7/06 |
| | | | | 310/43 |

FOREIGN PATENT DOCUMENTS

| | | |
|---|---|---|
| DE | 10 2011 054 955 A1 | 5/2013 |
| DE | 10 2011 054955 A1 | 5/2013 |
| KR | 10-2015-0015939 A | 2/2015 |

* cited by examiner

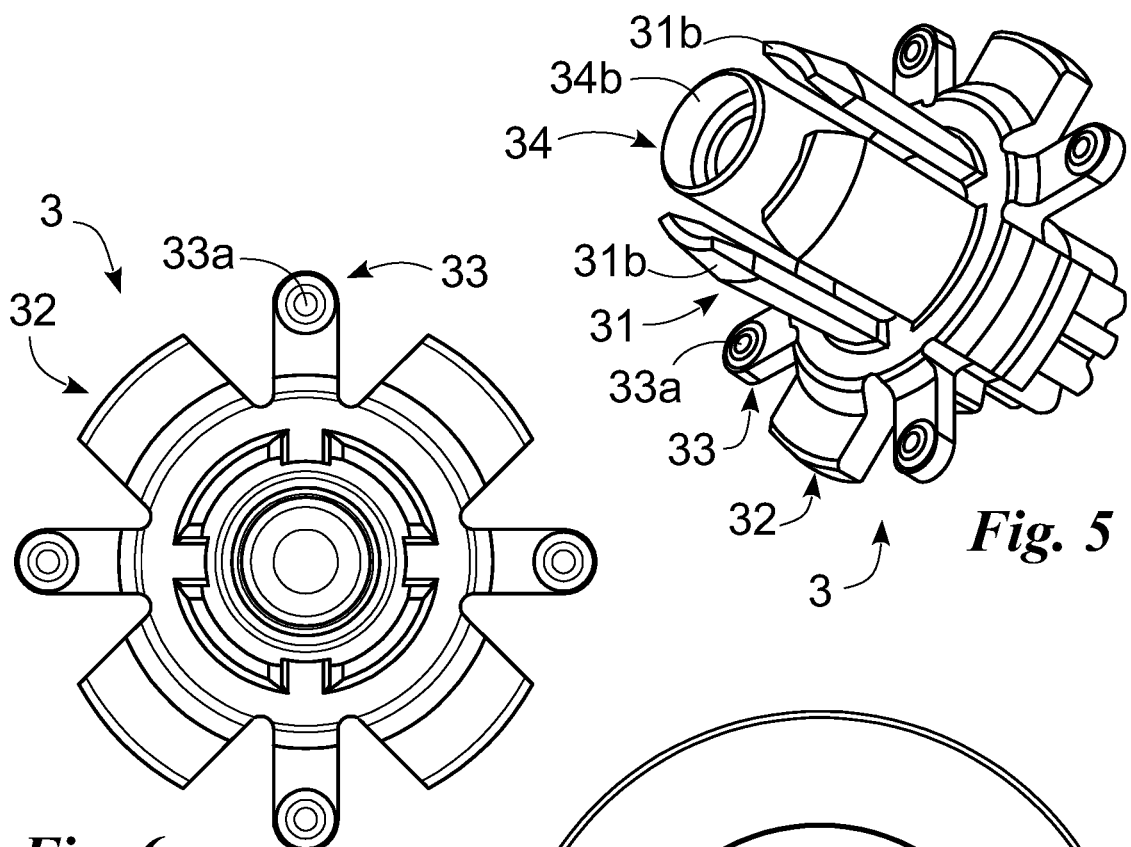
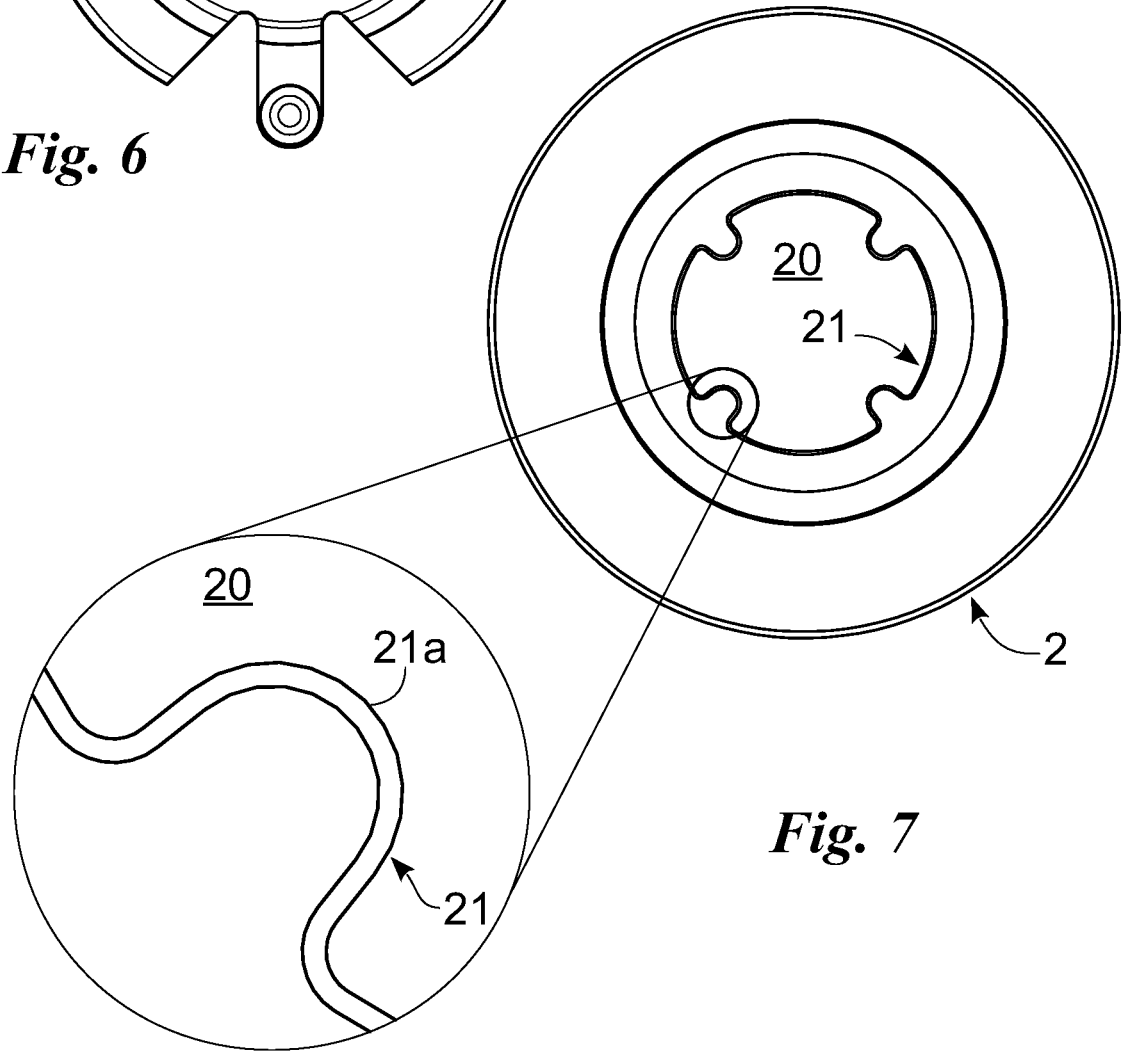

ROTOR GROUP FOR ELECTROMECHANICAL COMPONENTS AND METHOD FOR MANUFACTURING SAID ROTOR GROUP

FIELD OF THE INVENTION

The present invention relates to a rotor group for electromechanical components comprising a substantially cylindrical, magnetic element, defining a main axis, two bases and a side surface, and comprising a through hole substantially centred on the main axis, defining inner walls and comprising at least one groove, for the rotational constraint around the main axis of a transmission element with respect to the magnetic element on the inner walls, the transmission element in polymeric material, mainly positioned inside the through hole.

In particular, the invention relates to a ferromagnetic component, i.e. the permanent magnet, coupled to a second polymeric component which acts as a connection element with the mechanical parts.

DESCRIPTION OF THE PRIOR ART

It is known from the prior art that the permanent magnets of rotors for electromechanical components are mainly made of ferrite, which is a material consisting of compacted iron powders and ceramic powers, obtained by pressing and baking in furnace and characterized by high hardness and high fragility.

The use of the aforesaid permanent magnets, as rotors, is allowed by coupling to a transmission element made of polymeric material placed axially with respect to the rotation axis of the rotor group. Said coupling is usually obtained by means of the overmoulding process. In the overmoulding technique, the ferromagnetic material, e.g. ferrite, is inserted into the mould in which the polymeric material is injected.

The correct filling of the mould and thus the correct geometry of the final product are ensured by applying high pressures during the production process.

The described prior art comprises some major drawbacks.

In particular, all handling operations performed on ferrites, both during the step of insertion into the moulds for coupling with the polymeric material and during the step of extraction thereof, are delicate and, if performed in combination with highly automated processes, cause a substantial increase of the residual internal strain state in the ceramic ferrites, with consequent induction of micro-cracks, which lead to a worsening of the fatigue resistance, and thus of the durability, of the concerned object.

A further aggravating circumstance is given by the impossibility of identifying these breakages during the canonical manufacturing checks.

Some technical developments are however known, promoted in order to obviate such drawbacks, which substantially adopt two different philosophies: either reducing and selecting the possible produced rotor groups containing faults by means of more sophisticated qualification controls or minimizing the residual strains to which the ferrites are subjected during the step of injecting the polymeric material through alternative moulding steps.

For example, as regards the aforesaid techniques, patent applications U.S. Pat. No. 3,953,752 and JP-A-555162865 are known, which are, in this order, a complex method for coupling the mechanical transmission element to the magnet and a solution in which the magnet is previously coated with a polymeric base on which the mechanical connection is then welded.

However, the known described techniques comprise some important drawbacks due to the costs and complexity of the concerned processes and components, mainly with reference to U.S. Pat. No. 3,953,752. Furthermore, said techniques have, in both cases, residual strains due to the pressure of the polymeric materials, during the operation of the rotor group, which induce micro-cracks in the permanent magnet with consequent worsening of the durability of the concerned object.

SUMMARY OF THE INVENTION

In this situation, the technical task underlying the present invention is to create a rotor group for electromechanical components and a method for manufacturing said rotor group capable of substantially avoiding the mentioned drawbacks.

In the scope of said technical tasks, it is an important object of the invention to obtain the elimination of residual strains caused by the type of coupling of the rotor group components and the production processes currently employed.

It is another important object of the invention to provide a manufacturing method such that the rotor group thus produced is more cost-effective than the technique currently used.

Finally, another important object of the invention is given by the increase of speed for manufacturing the rotor group by virtue of the concerned method.

The technical task and the specified objects are achieved by a rotor group for electromechanical components comprising a substantially cylindrical, magnetic element, defining a main axis, two bases and a side surface, and comprising a through hole substantially centred on the main axis, defining inner walls and comprising at least one groove, for the rotational constraint around the main axis of a transmission element with respect to the magnetic element on the inner walls, the transmission element in polymeric material, mainly positioned inside the through hole, and comprises: coupling tabs, in contact with the inner walls of the through hole, suitable for the rotational constraint around the main axis of the transmission element with respect to the magnetic element, the coupling tabs presenting in situ bent free ends, in contact with at least one of the bases, suitable to constrain the translation along the main axis of the transmission element with respect to the magnetic element.

BRIEF DESCRIPTION OF THE DRAWINGS

The features and advantages of the invention will be explained in the following detailed description of preferred embodiments of the invention, with reference to the accompanying drawings, in which:

FIG. 5 is a perspective view of the transmission element according to the invention;

FIG. 6 shows a top view of the transfer element according to the invention; and

FIG. 7 shows a top view of the magnetic element and the detail of the groove, or reference member, on the inner hole according to the invention.

DESCRIPTION OF THE PREFERRED EMBODIMENTS

Figure 1:
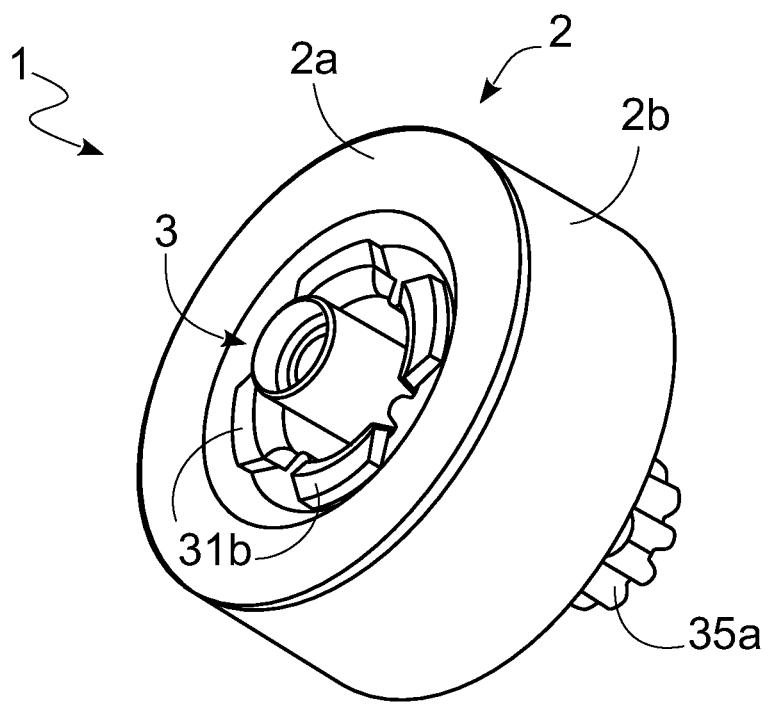
FIG. 1 shows a perspective view of the rotor group according to the invention.
Figure 2:
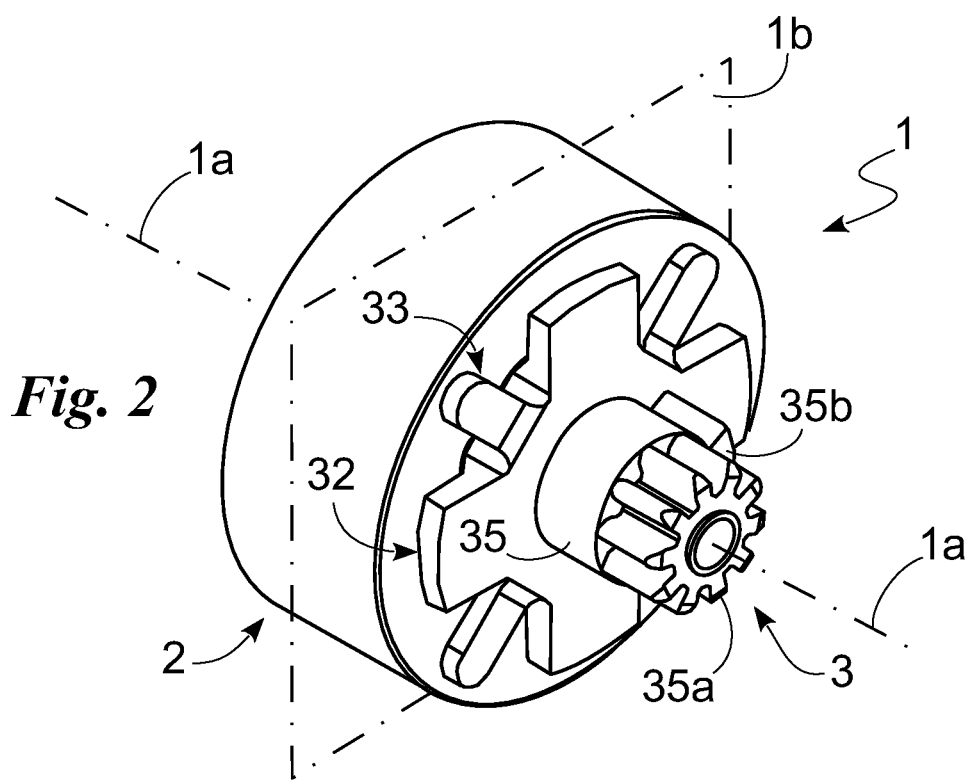
FIG. 2 shows a perspective view, from the opposite side, of the rotor group according to the invention.
Figure 3:
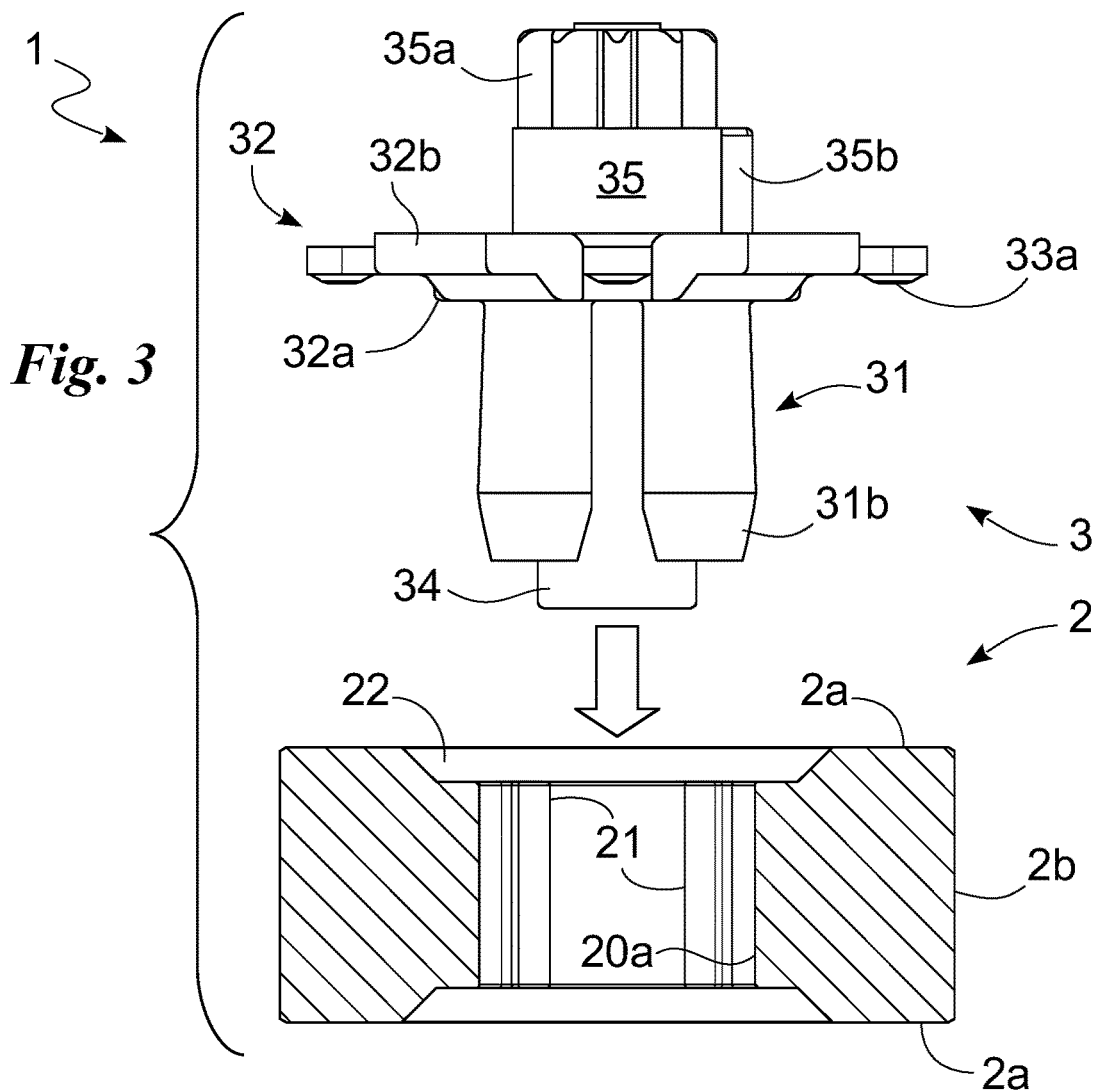
FIG. 3 shows a side view of the insertion mechanism according to the invention of the transmission element in the magnetic element in a sectional view along the symmetry plane.
Figure 4:
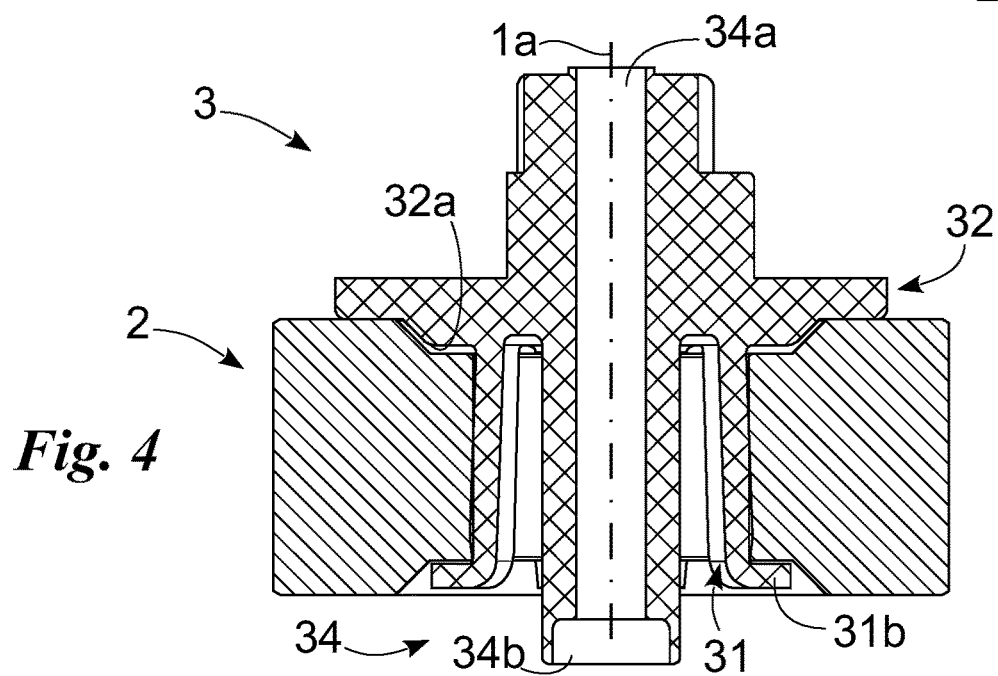
FIG. 4 shows a sectional view of the rotor group according to the invention on the symmetry plane.

In the present document, the measurements, values, shapes and geometric references (such as perpendicularity and parallelism), when associated with words such as "about" or similar words such as "almost" or "substantially", are to be understood as short of measurement errors or inaccuracies due to production and/or manufacturing errors, and especially short of a minor deviation from the value, measurement, shape or geometric reference with which it is associated. For example, such words, if associated with a value, preferably indicate a deviation not higher than 10% of the value itself.

Moreover, when used, words such as "first", "second", "upper", "lower", "main" and "secondary" do not necessarily identify an order, relationship priority or relative position, but may be simply used to distinguish different components more clearly.

With reference to the Figures, the rotor group according to the invention is indicated by reference numeral 1 as a whole.

It is preferably used in electromechanical elements, such as electrical motors, e.g. for household appliances. It comprises a permanent magnet, e.g. made of ferrite or neodymium or samarium/cobalt, adapted to be preferably rotated by electromagnetic induction in order to convert the electromagnetic energy into mechanical, e.g. rotational, energy. Moreover, said mechanical energy is transmitted to further components.

The rotor group 1 defines a main axis 1a and a main plane 1b perpendicular to the main axis 1a.

Briefly, the rotor group 1 for electromechanical components consist of two originally discrete elements: a magnetic element 2, comprising a through hole 20 of thickness preferably between 4 and 6 mm, and a transmission element 3, arranged within the through hole 20.

By way of example only, the magnetic element 2 has an annular cylindrical shape of height preferably between 6 and 10 mm, defined about the main axis 1a, and substantially consists of two bases 2a, preferably of diameter between 17 and 22 mm, on the surface of which two blind cavities 22 are obtained, adapted for housing said tightening components of the transmission element 3, and a side surface 2b.

It comprises the through hole 20 therein, having a smaller size surface than the section of the blind cavities 22, centred on the main axis 1a, and consisting of inner walls 20a on which at least one groove 21, or reference member, is obtained for the rotational constraint, adapted to be coupled to the transmission element 3, as described below.

In detail, the aforesaid groove 21, or reference member, consists of protuberances 21a, arranged radially, in sectional view on the main plane 1b, about the main axis 1a, which extend in a direction parallel to the main axis 1a along the entire inner wall 20a.

Such protuberances are preferably rounded in shape to ensure better strength and, in the case in point, extend in a sectional view on the main plane 1b towards the main axis 1a by approximately 2 mm, for example with an external curvature radius preferably from 0.2 mm to 0.8 mm and furthermore with a connecting radius to the inner walls 20a preferably from 0.1 mm to 0.3 mm. They are preferably four in number, but the number may alternatively be different. From the functional point of view, they divide and delimit the inner walls 20a of the through hole 20 in order to define the reference member 21, in a complementary manner with respect to the coupling means of the transmission element 3, thus ensuring a correct centring of the rotor group assembly 1 and forming a rotational constraint about the main axis 1a of the transmission element 3 with respect to the magnetic element 2.

The transmission element 3 is arranged inside the through hole 20 of the magnet. It is preferably made of polymeric material and consists of a central cylinder structure 34 comprising a through hole 34a, adapted to accommodate a possible connection shaft along the main axis 1a. A shoulder 34b is present in the through hole 34a adapted to engage the possible aforesaid shaft.

The transmission element 3 further comprises a base support 32 adapted to block the translation, along the main axis 1a, of the transmission element 3 with respect to the magnetic element 2. It substantially rests on a base 2a.

The base support 32 preferably comprises rigid tabs 32b, radially arranged on the main plane 1b and preferably symmetrically with respect to the main axis 1a, and a shoulder 32a adapted to be inserted into the surface cavity 22.

Conveniently, the transmission element 3 further comprises coupling tabs 31 integrally connected to the base support 32 and extending into the through hole 20.

They comprise an axial portion 31a in contact with the inner walls 20a of the through hole 20 in a complementary manner to the reference member 21. In essence, between the axial portions 31a of adjacent tabs 31 there are spaces which have the same extension and position as the protuberances 21a. Furthermore, the axial portions 31a have a length approximately equal to the thickness of the through hole 20 of the magnetic element 2. The axial portion 31a of the tabs 31 thus constrains the mutual rotation about the axis 1a of the two elements 2 and 3 and allows a correct self-centring of the aforesaid elements 2 and 3.

The tabs 31 further comprise folded free ends 31b, in one piece with the first portion 31a and on opposite part with respect to the base support 32.

Such free ends 31b are in contact with the base 2a, opposite to the base support 32, and form a translation constraint along the main axis 1a of the transmission element 3 with respect to the magnetic element 2, thus ensuring a correct tightening of the rotor group assembly 1.

Flexible and symmetric radial tabs 33 are also placed about the base support 32 with respect to the main axis 1a. They comprise, in a sectional view, a protuberance 33a, appropriately placed on the free end of the tabs 33, protruding in an axial direction parallel to the main axis 1a and directed towards the contact base 2a of the magnetic element 2.

The opening flexibility of such tabs allows to add an axial tensioning in the direction of the main axis 1a such as to further ensure the correct tightening between the discrete elements of the rotor group 1.

Connection elements with further components may be present over the base support 32. For example, a cylinder 35 may be present, surmounted by a crown gear 35a concentric thereto, centred with respect to the main axis 1a and adapted to transmit the rotation to any other connection gears by means of toothing or by means of an angular constraint 35*b* placed by the sides of the cylinder itself.

The invention also teaches a new method for manufacturing the rotor group 1 described in structural terms above.

In such a method, the magnetic element 2 and the transmission element 3 are initially manufactured according to processes known per se. The transmission element is preferably made in one piece and of polymeric material, e.g. by moulding or the like.

The method preferably comprises inserting the transmission element 3 into the through hole 20 to form rotor 1 and then bending the free ends 31*b* of the coupling tabs 31.

Preferably, the bending of the free ends 31*b* of the coupling tabs 31 is provided by means of ultrasound bending.

Ultrasound bending comprises the use of a bending tool made to vibrate at ultrasound frequency, typically between 20 and 50 kHz in contact with the part being produced, to provide thermal energy needed for the deformation of the thermoplastic materials, and for bending the part.

Alternatively, the bending is obtained by thermoforming, which substantially differs from the previous technique due to the absence of the tool and the production in pressurized environment, or mechanical bending, which take advantage of the plastic features of the material, or other.

Alternatively, the free ends 31*b* of the tabs 31 could be made in a first step and temporarily deformed for the insertion into the hole with successive elastic return and interlocking constraint.

Important advantages are achieved by the rotor group 1 and the manufacturing method thereof according to the invention.

The applicant has determined that the conventional techniques used for the production of rotating permanent magnets induce residual internal strains, despite possible measures during the step of manufacturing, as previously mentioned. These internal strains are due to the permanent pressures applied by the polymer on the ferrites and are highly detrimental, because they cause micro-cracks on the magnetic material, which is fragile per se, which rapidly deteriorate the finished product.

The applicant has also recognized the severe drawback whereby the breakage of the conventionally manufactured rotors cannot be identified during the canonical production checks.

The main advantage of the rotor group 1 is the elimination of the aforesaid internal residual strains obtained by virtue of a different coupling type, which ensures the self-centring of the polymeric material with the permanent magnet by means of efficient radial tabs 31 and a different method of manufacturing the part itself.

From a qualitative point of view only, the transmission element appears as an open basket comprising expanded free ends, which provides the coupling means with a low structural complexity combined with an excellent functionality of the rotor group 1 which, in addition to the manufacturing method associated therewith according to the invention, allows to obtain considerable advantages from the economic point of view, because the manufacturing method is simplified with respect to the current art, and from the point of view of manufacturing speed, by virtue of the use of technologies with production times substantially shorter than those conventionally provided.

The invention is susceptible of variants within the scope of the inventive concept defined by the claims. In such a scope, all the details can be replaced by equivalent elements and materials, shapes and size may be various.

The invention claimed is:

1. A rotor group for electromechanical components, comprising:
    a substantially cylindrical, magnetic element, defining a main axis, two bases and a side surface, and comprising a through hole substantially centered on said main axis, defining inner walls and comprising at least one groove, for the rotational constraint around said main axis of a transmission element with respect to said magnetic element on said inner walls,
    said transmission element in polymeric material, mainly positioned inside said through hole, comprising:
    coupling tabs, in contact with said inner walls of said through hole, configured for the rotational constraint around said main axis of said transmission element with respect to said magnetic element, and
    said coupling tabs comprising in situ bent free ends, in contact with at least one of said bases, configured to constrain the translation along said main axis of said transmission element with respect to said magnetic element,
    a base support configured for contact with at least one of the two bases of said magnetic element,
    said base support comprising radial tabs symmetrical with respect to said main axis, configured to flex along their opening and to tighten in the direction of said main axis said transmission element, so as to tighten and align along said main axis said transmission element to said magnetic element,
    wherein each of said radial tabs comprises a protuberance, protruding from the inner surface of said base support in the direction of said main axis and oriented towards said magnetic element, configured to guarantee a proper tightening for axial tension.

2. The rotor group according to claim 1, which comprises said transmission element comprising an open basket comprising dilated ends.

3. The rotor group according to claim 2, wherein:
    said magnetic element comprises blind side cavities on said bases defined by drilling surfaces oversized compared to the cross-section of said through hole,
    wherein said base support comprises a shoulder facing said magnetic element and protruding towards the magnetic element, and
    wherein the cavities house said bent free ends of said coupling tabs and shoulder.

4. The rotor group according to claim 1, wherein said transmission element comprises a through hole oriented axially in the direction of said main axis and a shoulder for housing and constraining the axial translation of a possible connection shaft of said rotor group.

5. The rotor group according to claim 4, wherein:
    said magnetic element comprises blind side cavities on said bases defined by drilling surfaces oversized compared to the cross-section of said through hole,
    wherein said base support comprises a shoulder facing said magnetic element and protruding towards the magnetic element, and
    wherein the cavities house said bent free ends of said coupling tabs and shoulder.

6. The rotor group according to claim 1, wherein:
    said magnetic element comprises blind side cavities on said bases defined by drilling surfaces oversized compared to the cross-section of said through hole,
    wherein said base support comprises a shoulder facing said magnetic element and protruding towards the magnetic element, and wherein the cavities house said bent free ends of said coupling tabs and shoulder.

7. A method of making the rotor group of claim 1, comprising:
inserting said transmission element in said through hole, bending said coupling tabs which comprise in situ said bent free ends.

8. The method according to claim 7, wherein said bending is performed by ultrasonic bending means.

9. The method according to claim 7, wherein said bending is performed by means of mechanical bending.

10. The method according to claim 7, wherein said transmission element comprises an open basket comprising dilated ends.

11. The method according to claim 7, wherein said transmission element comprises a through hole oriented axially in the direction of said main axis and a shoulder for housing and constraining the axial translation of a possible connection shaft of said rotor group.

12. The method according to claim 7, wherein:
said magnetic element comprises blind side cavities on said bases defined by drilling surfaces oversized compared to the cross-section of said through hole,
wherein said base support comprises a shoulder facing said magnetic element and protruding towards the magnetic element, and
wherein the cavities house said bent free ends of said coupling tabs and shoulder.

* * * * *